S. W. BENNETT.
BALL CASTER.
APPLICATION FILED FEB. 20, 1911.
1,005,799.
Patented Oct. 17, 1911.
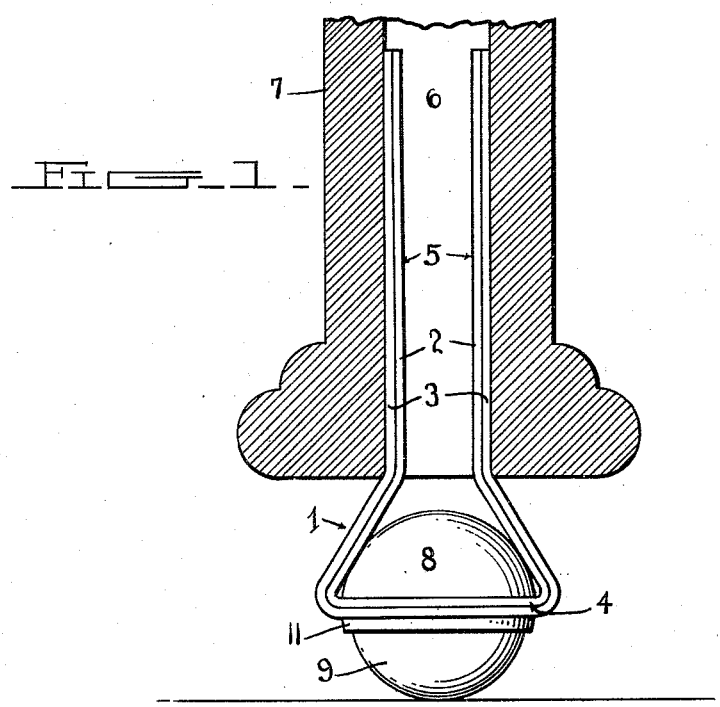
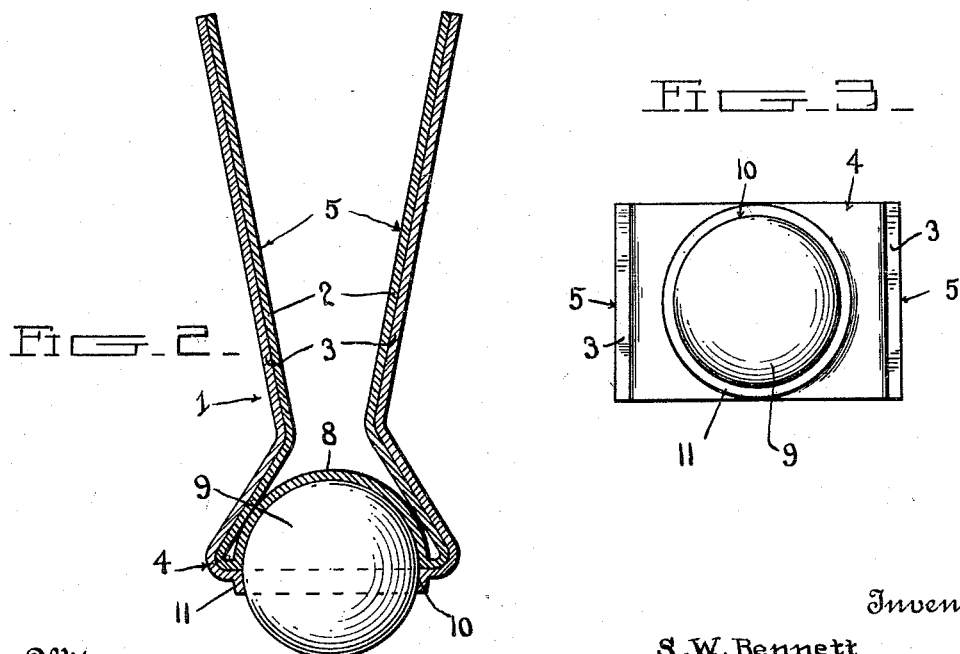
Witnesses
L. B. James
O. B. Hopkins
Inventor
S. W. Bennett
by H. B. Willson & Co.
Attorneys

UNITED STATES PATENT OFFICE.

SILAS W. BENNETT, OF SOMERVILLE, MASSACHUSETTS.

BALL-CASTER.

1,005,799.      Specification of Letters Patent.      Patented Oct. 17, 1911.

Application filed February 20, 1911. Serial No. 609,603.

*To all whom it may concern:*

Be it known that I, SILAS W. BENNETT, a citizen of the United States, residing at Somerville, in the county of Middlesex and State of Massachusetts, have invented certain new and useful Improvements in Ball-Casters; and I do declare the following to be a full, clear, and exact description of the invention, such as will enable others skilled in the art to which it appertains to make and use the same.

This invention relates to improvements in ball casters.

One object of the invention is to provide a ball caster having an improved ball supporting and attaching mechanism which will be simple, strong, durable and inexpensive in construction and which will securely hold the caster in place on the object to which the same is applied.

With these and other objects in view, the invention consists of certain novel features of construction, combination and arrangement of parts as will be more fully described and particularly pointed out in the appended claims.

In the accompanying drawings: Figure 1 is a vertical sectional view through the lower portion of the leg of a bedstead or piece of furniture showing the application of my improved caster thereto; Fig. 2 is a central vertical sectional view of the caster; Fig. 3 is a bottom plan view of the same.

In the embodiment of the invention I provide an attaching and supporting frame 1 which is formed from two sheet metal bars or plates 2 and 3. The plates 2 and 3 are welded, soldered or firmly secured together in any suitable manner. The plates when thus secured together are bent midway between their ends to form a bearing head 4 the sides of which are bent inwardly at acute angles to the bottom. After being bent to form the head 4 the ends of the bars or plates 2 and 3 are bent outwardly to form spring gripping members 5 which are adapted to be pressed together and inserted into a socket 6 formed in the lower end of the furniture leg 7 to which the caster is to be applied. When thus inserted into the socket or tubular end of the leg the members 5 will spring into engagement with the sides of the socket and thus hold the frame in tight frictional engagement with the walls of the socket thereby holding the caster in place.

In the portion of the inner plate 2 which forms the inner side of the bottom of the head is pressed an inwardly projecting hemispherical socket 8 with which is revolubly engaged the ball or spherical roller 9 of the caster. When thus arranged the lower portion of the ball 9 will project through a circular opening 10 formed in the adjacent horizontal portion of the outer bar 3 and will be revolubly secured in the socket 8 by a depending flange 11 formed around the edge of the opening 10 and projecting below the center of the ball with which it is closely engaged thus revolubly holding the latter in place to form the roller of the caster.

In assembling the parts the ball may be engaged with the socket 8 before the plates or bars 2 and 3 are secured together or the ball may be inserted through the flanged opening 10 and into the socket after the bars have been secured and the flange 11 is then crimped or pressed inwardly into engagement with the ball.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention what I claim is:

1. A ball caster comprising a frame constructed of two pieces of metal secured together and bent to form a head, a socket formed in the head portion of one of said plates, a ball revolubly mounted in said socket and means on the other plate to hold said ball in operative engagement with said socket.

2. A ball caster comprising a frame constructed from two metal bars or plates secured together and bent midway between their ends, to form a head and having their ends bent outwardly to form spring gripping members, one of said plates having in the head portion thereof a circular aperture, a socket formed in the adjoining part of the other plate, a spherical roller revolubly mounted in said socket and projecting through said opening and a flange formed around the edge of said opening and adapted to be engaged with the sides of the ball whereby the latter is held in operative engagement with said socket.

In testimony whereof I have hereunto set my hand in presence of two subscribing witnesses.

SILAS W. BENNETT.

Witnesses:
JOSEPH V. SILVERIA,
ANNA F. LEACH.

Copies of this patent may be obtained for five cents each, by addressing the "Commissioner of Patents, Washington, D. C."